United States Patent
Sakurai et al.

(10) Patent No.: US 9,454,495 B2
(45) Date of Patent: Sep. 27, 2016

(54) MEMORY SYSTEM CAPABLE OF PROHIBITING ACCESS TO APPLICATION SOFTWARE AND SYSTEM SOFTWARE

(75) Inventors: Shuichi Sakurai, Yokohama (JP); Takashi Wakutsu, Kamakura (JP); Kuniaki Ito, Funabashi (JP); Yasufumi Tsumagari, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 720 days.

(21) Appl. No.: 13/235,421

(22) Filed: Sep. 18, 2011

(65) Prior Publication Data

US 2012/0221770 A1  Aug. 30, 2012

(30) Foreign Application Priority Data

Feb. 28, 2011 (JP) ................................ 2011-042864

(51) Int. Cl.
| | |
|---|---|
| *G06F 12/02* | (2006.01) |
| *G06F 12/14* | (2006.01) |
| *G06F 17/30* | (2006.01) |
| *G06F 21/79* | (2013.01) |

(52) U.S. Cl.
CPC ....... *G06F 12/1425* (2013.01); *G06F 12/1416* (2013.01); *G06F 17/30091* (2013.01); *G06F 21/79* (2013.01)

(58) Field of Classification Search
None
See application file for complete search history.

(56) References Cited

U.S. PATENT DOCUMENTS

| | | | |
|---|---|---|---|
| 5,802,325 | A | 9/1998 | Le Roux |
| 7,440,774 | B2 | 10/2008 | Croome |
| 7,702,821 | B2 | 4/2010 | Feinberg et al. |
| 2002/0169960 | A1* | 11/2002 | Iguchi et al. ............ 713/174 |
| 2003/0033496 | A1 | 2/2003 | Takagi et al. |
| 2004/0103234 | A1 | 5/2004 | Zer et al. |
| 2004/0205268 | A1 | 10/2004 | Takinosawa et al. |
| 2006/0026338 | A1 | 2/2006 | Ebara et al. |
| 2006/0161749 | A1 | 7/2006 | Chen et al. |
| 2008/0141029 | A1 | 6/2008 | Culver |
| 2009/0063800 | A1* | 3/2009 | Ehama et al. ............ 711/163 |

(Continued)

FOREIGN PATENT DOCUMENTS

| | | |
|---|---|---|
| CN | 101142581 A | 3/2008 |
| JP | 2001-195553 | 7/2001 |

(Continued)

OTHER PUBLICATIONS

Office Action issued Oct. 20, 2014 in Chinese Patent Application No. 201110275039.0 (with English language translation).

(Continued)

*Primary Examiner* — Charles Rones
*Assistant Examiner* — Ryan Dare
(74) *Attorney, Agent, or Firm* — Oblon, McClelland, Maier & Neustadt, L.L.P.

(57) ABSTRACT

According to one embodiment, a memory system includes an application module, a storage module, and a control module. The storage module stores user data, application software configured to control operation of the application module, and management information used to manage the user data and the application software. The control module controls writing and erasing of the storage module. The control module masks information indicating an access-prohibited area included in the management information read from the storage module, the access-prohibited area includes the application software.

17 Claims, 7 Drawing Sheets

(56) References Cited

U.S. PATENT DOCUMENTS

| | | | |
|---|---|---|---|
| 2010/0169548 A1 | 7/2010 | Kanda | |
| 2012/0284527 A1* | 11/2012 | Nagpal et al. | ................ 713/189 |
| 2013/0318281 A1 | 11/2013 | Fujimoto et al. | |

FOREIGN PATENT DOCUMENTS

| | | |
|---|---|---|
| JP | 2002-329180 | 11/2002 |
| JP | 2003-123030 | 4/2003 |
| JP | 2003-162433 | 6/2003 |
| JP | 2004-252968 | 9/2004 |
| JP | 2006-507608 | 3/2006 |
| TW | 200302964 | 8/2003 |
| TW | 200418305 | 9/2004 |
| WO | WO2004-077306 | 9/2004 |

OTHER PUBLICATIONS

Taiwanese Office Action issued Jan. 21, 2014, in Taiwan patent application No. 100132696 (with English translation).
Office Action issued Feb. 16, 2015 in Chinese Patent Application No. 201110275039.0 (with English language translation).
Office Action issued May 21, 2015 in Chinese Patent Application No. 201110275039.0 (with English language translation).
Office Action issued May 6, 2014 in Chinese Patent Application No. 201110275039.0 (with English language translation).
Office Action issued Sep. 10, 2014 in Taiwanese Patent Application No. 100132696 (with English language translation).
Japanese Office Action issued Jul. 9, 2013, in Japan Patent Application No. 2011-042864 (with English translation).
U.S. Appl. No. 13/235,421, filed Sep. 18, 2011, Sakurai, et al.
U.S. Appl. No. 13/956,825, filed Aug. 1, 2013, Fujimoto, et al.

* cited by examiner

| Application Name | WLAN | DHCP | Short Description |
|---|---|---|---|
| Server Upload App. | Infra-STA | Client | Upload photo data to Web server |
| P2P Server App. | Infra-AP | Server | Send photo data to other devices |
| P2P Restricted Server App. | Infra-AP | Server | Send photo data to other authenticated devices |
| P2P Client App. | Infra-STA | Client | Receive photo data from other devices |
| Initial App. | - | - | Initial state of the Card |

MEMORY SYSTEM CAPABLE OF PROHIBITING ACCESS TO APPLICATION SOFTWARE AND SYSTEM SOFTWARE

CROSS-REFERENCE TO RELATED APPLICATIONS

This application is based upon and claims the benefit of priority from prior Japanese Patent Application No. 2011-042864, filed Feb. 28, 2011, the entire contents of which are incorporated herein by reference.

FIELD

Embodiments described herein relate generally to a memory system equipped with a wireless communication function, for example.

BACKGROUND

Memory systems equipped with application modules other than the memory function, for instance a wireless communication function such as a wireless LAN, have been developed. Such a memory system stores application software configured to control the operation of the wireless communication function and system software configured to control the operation of a controller, together with user data, in a storage module, which can be accessed by the user. This can cause the user to delete or alter the application software or the system software stored in the storage module.

DETAILED DESCRIPTION

In general, according to one embodiment, a memory system includes an application module, a storage module, and a control module. The storage module stores user data, application software configured to control operation of the application module, and management information used to manage the user data and the application software. The control module controls writing and erasing of the storage module. Of the management information read from the storage module, the control module masks information indicating an access-prohibited area included in the management information read from the storage module, the access-prohibited area includes the application software.

Hereinafter, an embodiment will be described with reference to the accompanying drawings.

Figure 1:
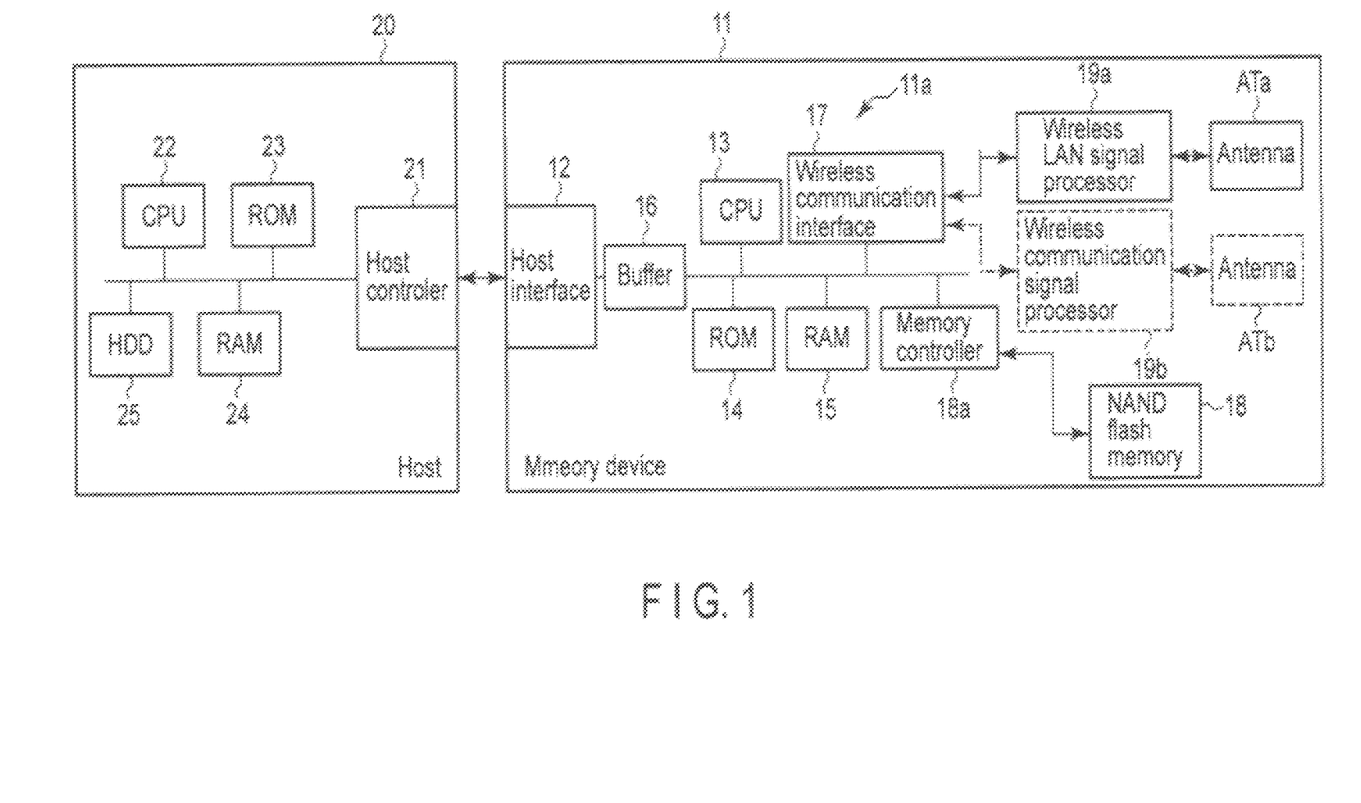
FIG. 1 is a block diagram schematically illustrating a memory system applied to an embodiment.

FIG. 1 schematically shows a memory system according to the present embodiment.

The memory system comprises a memory device 11 such as an SD card, and a host 20. The memory device 11 is also referred to as an SD card. The host 20 will also be referred to as a host device. The memory device 11 does not necessarily have a card shape, and may be mounted on the host 20 so as not to be detached therefrom.

The memory device 11 operates upon receipt of a power supply from the host 20 when the memory device 11 is connected thereto, and performs a process in response to an access from the host 20. The memory device 11 includes a card controller 11a.

The card controller 11a includes, for example, a host interface 12, a CPU 13, a read-only memory (ROM) 14, a random access memory (RAM) 15, a buffer 16, and a wireless interface 17 as an extension function interface, which are connected via a bus. Further, a memory controller 18a is connected to the bus. A NAND flash memory 18, for example, is connected to the memory controller 18a. A wireless LAN signal processor 19a as an extension function module (application module) is connected to the wireless communication interface 17. An antenna ATa, configured to transmit and receive high-frequency signals, is connected to the wireless LAN signal processor 19a.

The extension function module may be configured to form a multi-function SD card by further providing a wireless communication signal processor 19b for signals other than wireless LAN signals, and an antenna ATb connected to the wireless communication signal processor 19b, as well as the wireless LAN signal processor 19a. The wireless LAN signal processor 19a controls a wireless communication function using Wi-Fi (registered trademark), for example, and the wireless communication signal processor 19b controls a proximity wireless communication function using TransferJet (registered trademark), for example. It is to be noted that the functions provided in the extension function module are not limited to wireless communications.

The host interface 12 performs interface processing between the card controller 11a and the host 20.

On the other hand, the wireless communication interface 17 performs interface processing between the wireless LAN signal processor 19a and the wireless communication signal processor 19b. The memory controller 18a performs interface processing between the card controller 11a and the NAND flash memory 18.

The CPU 13 manages the operation of the entire memory device 11. A program designed to control the CPU 13 is executed by using firmware (control program, for example) stored in the ROM 14 or by being loaded on the RAM 15, and thereby a predetermined process is performed. That is, the CPU 13 generates a variety of tables and an extension register designed to control the wireless communication function on the RAM 18, accesses an area in the NAND flash memory 18 in response to a write command, a read command, or an erase command from the host 20, and controls a data transfer process via the buffer 16.

The ROM 14 stores at least part of firmware, such as a control program, used by the CPU 13. The RAM 15 is used as a work area of the CPU 13, and stores a control program, a variety of tables, and an extension register, which will be described later.

The buffer 16 temporarily stores a certain amount (1 page, for example) of data when the buffer 16 writes data transmitted from the host 20 to the NAND flash memory 18, for example, and temporarily stores a certain amount of data when the buffer 16 transmits data read from the NAND flash memory 18 to the host 20. With the intervention of the buffer 16, it is possible to control the SD bus interface and the back end in asynchronous mode.

The NAND flash memory 18 is formed of a memory cell having a stacked gate structure, or a memory cell having a MONOS structure, for example. The NAND flash memory 18 stores user data, application software designed to control the operation of the wireless LAN signal processor 19a and the wireless communication signal processor 19b, and system software designed to control the operation of the card controller 11a, for example. The user data, the application software, and the system software are managed by a File Allocation Table (FAT), which will be described later.

The wireless LAN signal processor 19a processes wireless LAN signals. Control is performed via the wireless communication interface 17.

The host 20 is applicable to a digital camera, a portable phone, or a personal computer, for example. The host 20 comprises a host controller 21, a CPU 22, a ROM 23, a RAM 24, and a hard disc 25 (including an SSD), for example, which are connected via a bus.

The CPU 22 controls the entire host. The ROM 23 stores firmware necessary for the operation of the CPU 22. While the RAM 24 is used as a work area of the CPU 22, for example, programs that can be executed by the CPU 22 are also loaded therein and executed. The hard disc 25 holds a variety of data. The host controller 21 performs interface processing with the memory device 11 in a state where the memory device 11 is connected. Further, the host controller 21 issues a variety of commands, which will be described later, according to an instruction from the CPU 22.

Figure 2:
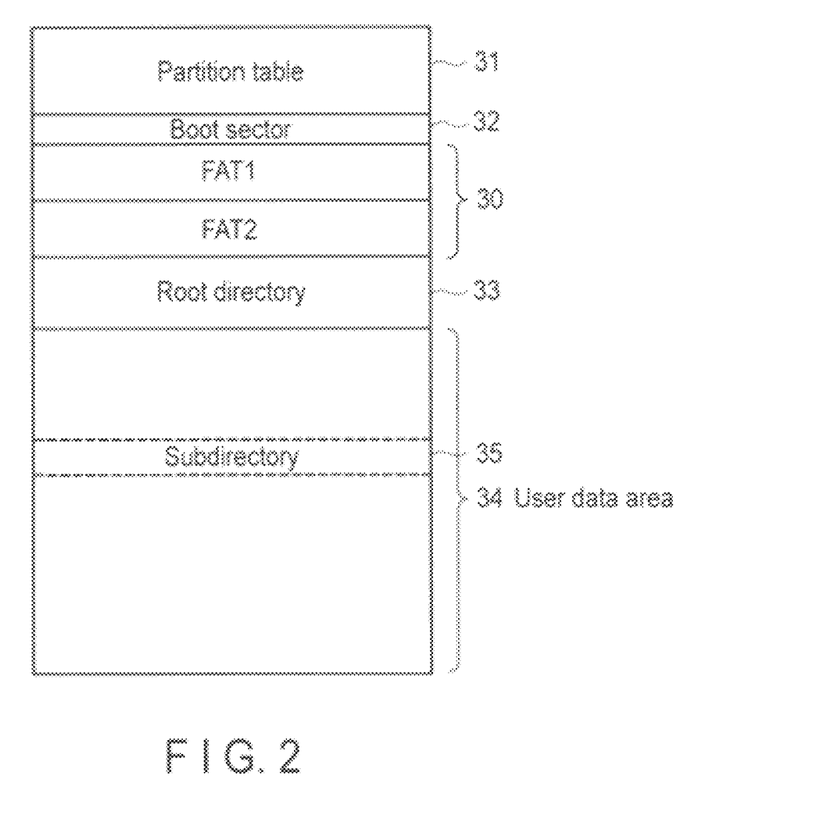
FIG. 2 illustrates a memory map of a NAND flash memory shown in FIG. 1.

FIG. 2 shows an example of a memory map of the NAND flash memory shown in FIG. 1. In the case of an SD memory card, the FAT format parameter is defined according to the card capacity by SD standards, in which an address of a FAT area 30 configured to store FAT1 and FAT2 is defined.

A partition area 31 is an area configured to store a partition table including partition information, for example. The boot area 32 is an area configured to store boot information.

FAT1 and FAT2 store management information used to manage information as to which cluster the file to be written is divided into and stored in. FAT1 and FAT2 store the same data, and when one of the FATs becomes deficient, data on the deficient FAT can be recovered using the other FAT. Further, FAT1 and FAT2 store information on the cluster assigned to the file, and stores relation of links of clusters in the NAND flash memory. By tracing information stored in FAT1 and FAT2, the file can be recovered to its original state.

A root directory area 33 stores information on root directory entries. When a subdirectory 35 is created under the root directory, the subdirectory 35 is created in a user data area 34. While the root directory 33 has a fixed address, a file entry of the subdirectory can be set in an arbitrary logic address.

Figure 3:
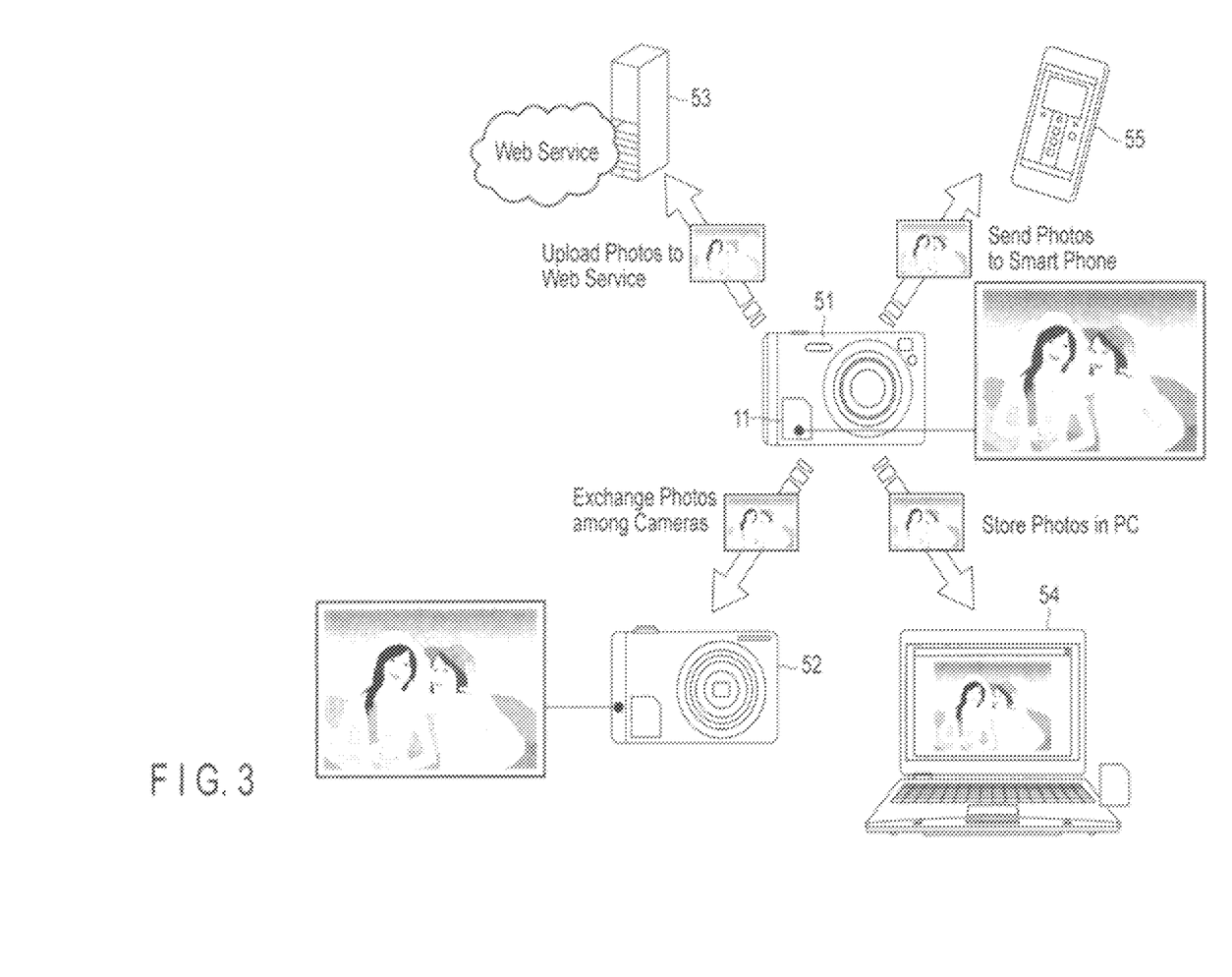
FIG. 3 is a block diagram illustrating an example of use of an SD card including a wireless local area network (LAN).

FIG. 3 shows an example of use of the memory device (SD card) 11 equipped with a wireless communication function. The memory device 11 is attached to digital cameras 51, 52 as a host, a server 53, a personal computer 54, or a cellular phone 55, for example.

The memory device 11 equipped with a wireless communication function is capable of transmitting and receiving picture data to and from another camera 52 via a wireless communication network, by being used with the digital camera 51. Further, the memory device 11 is capable of transferring picture data from the digital camera 51 to the server 53, by being connected to an external server 53, for example, via a wireless communication network. Moreover, the memory device 11 can be connected to a device such as the personal computer 54 or the cellular phone 55, for example, via a wireless communication network, and transfer picture data to the personal computer 54 or the cellular phone 55 from the digital camera 51.

Figure 4:
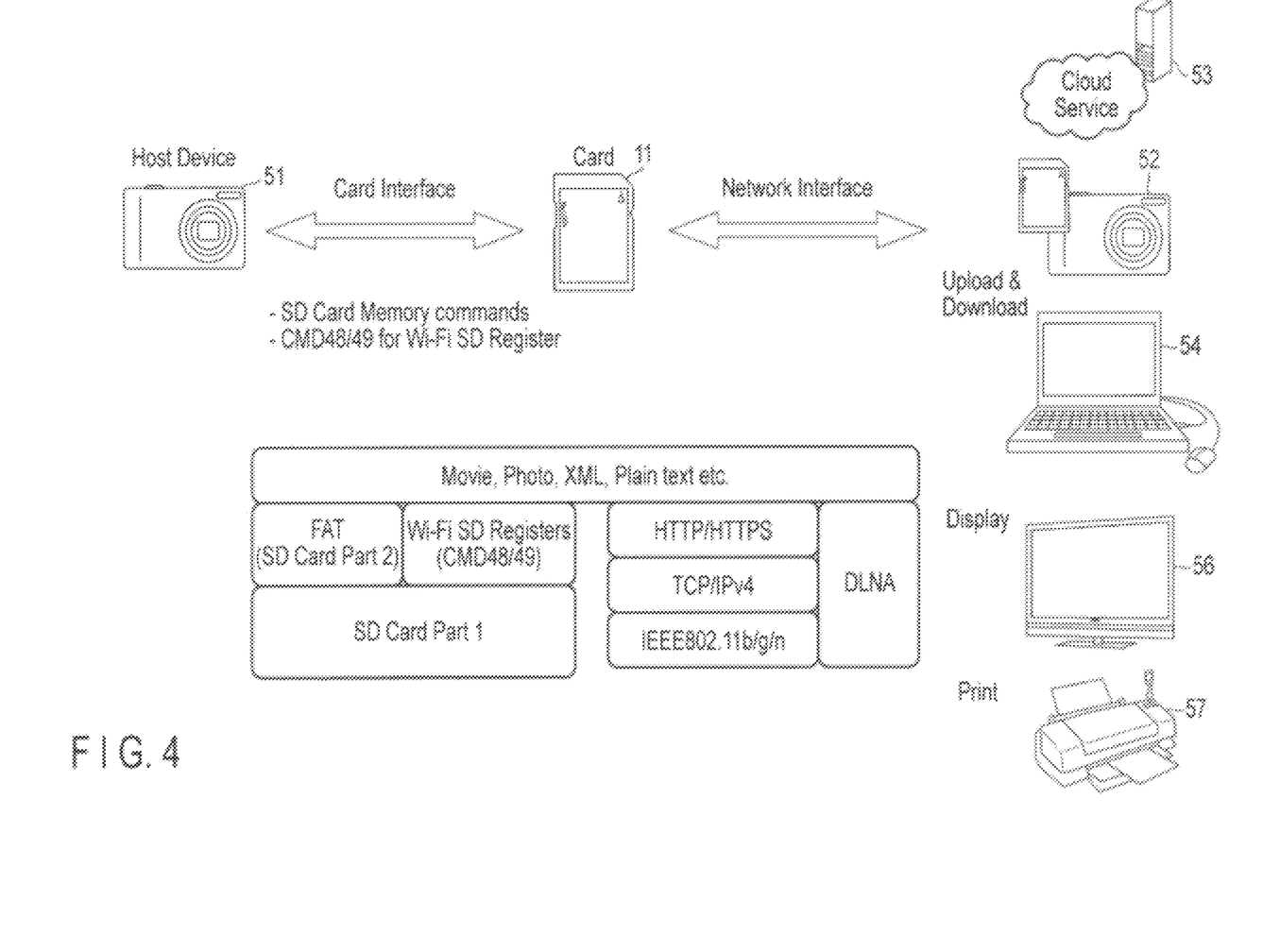
FIG. 4 shows an interface function provided in a memory device.

FIG. 4 shows an interface function of the memory device 11.

The memory device 11 equipped with a wireless communication function includes an interface function of serving as an interface between the memory device 11 and the digital camera 51, for example, which serves as a host device configured to control the memory device 11, and a network interface function of connecting the digital camera 51 with other electronic devices, such as the camera 52, the server 53, the personal computer 54, the television 56, and the printer 57, via a wireless LAN.

The above-described host interface (card interface) 12 has a function of accessing data in (reading and writing data from and to) the card via the FAT, and a function of accessing a register (Wi-Fi SD register, for example) dedicated to a card having a wireless communication function, according to "SD Specifications Part 1" and "SD Specifications Part 2", established by SD Association (SDA). In order to access a Wi-Fi SD register, a read command (CMD48) and a write command (CMD49) are used. The read command (CMD48) is a command to read data from a target register on a block-by-block basis, and the write command (CMD49) is a command to write data to a target register on a block-by-block basis.

For example, the host 20 issues a command dedicated to a Wi-Fi SD card to the memory device 11. Alternatively, the host 20 receives a status and a response dedicated to a Wi-Fi SD card from the memory device 11 using a write command (CMD49), in order to write data dedicated to a Wi-Fi SD card. Further, a read command (CMD48) is used so as to read data dedicated to a Wi-Fi SD card.

The wireless communication interface 17 is assumed such that the physical layer supports IEEE 802.11b/g/n, the network layer supports IPv4 or IPv6, the transport layer supports TCP, the presentation layer supports SSL/TLS, and the application layer supports HTTP or FTP. Further, a Digital Living Network Alliance (DLNA) function may be provided so as to handle communications with household appliances.

By providing two interfaces in the memory device 11, picture data (in JPEG or RAW format) and video data (in MPEG-2 TS or MP4 format) generated by a digital camera can be transmitted or received to or from a server or a device that supports HTTP. A server or a device that supports the DLNA enables playback of the picture or video and printing of the picture. By adding data (such as XML data and text data) generated by the host device when picture data and video data are transmitted, it becomes possible for the host device to perform an authentication operation on the server and peripheral devices and transmit and receive metadata thereto and therefrom.

Figure 5:
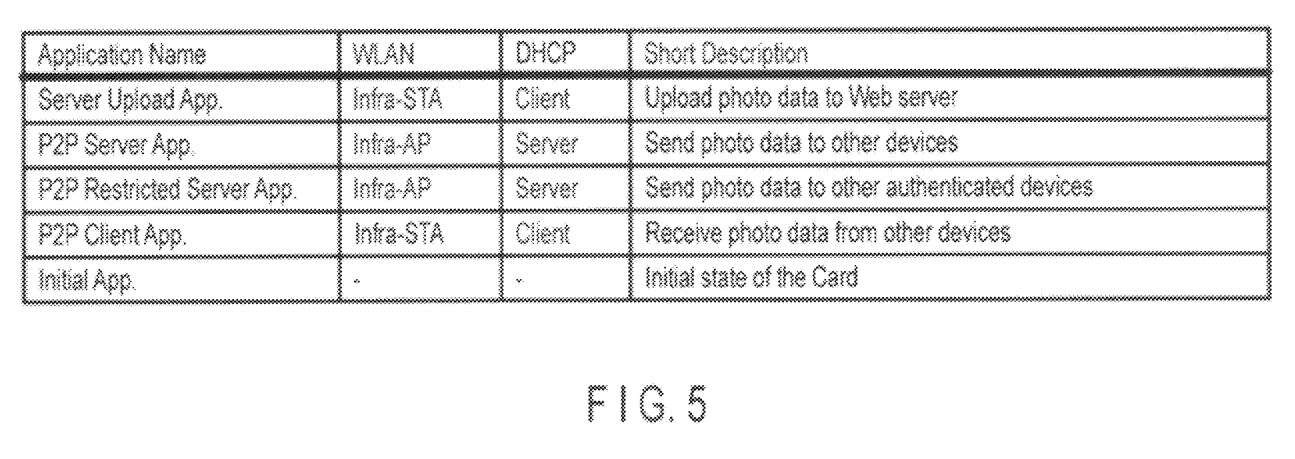
FIG. 5 illustrates an example of an application supported by a Wi-Fi (registered trademark) SD card.

FIG. 5 shows an example of an application software supported by a Wi-Fi SD card, which includes a server upload application configured to upload picture data to a web server, for example. As described above, at least part of the application software designed to control the operation of the wireless LAN signal processor 19a and the wireless communication signal processor 19b is stored in the NAND flash memory 18. The card controller 11a controls the application module (extension function module) by executing the application software.

(Management of Access to FAT)

As described above, the NAND flash memory 18 stores user data, and application software and system software designed to control the operation of the wireless LAN signal processor 19a and the wireless communication signal processor 19b. The application software and the system software must not be deleted or altered by the user. In the present embodiment, of the FAT information held in the memory controller 18a, the card controller 11a discloses only information excluding the application software and the system software to the user.

Figure 6:
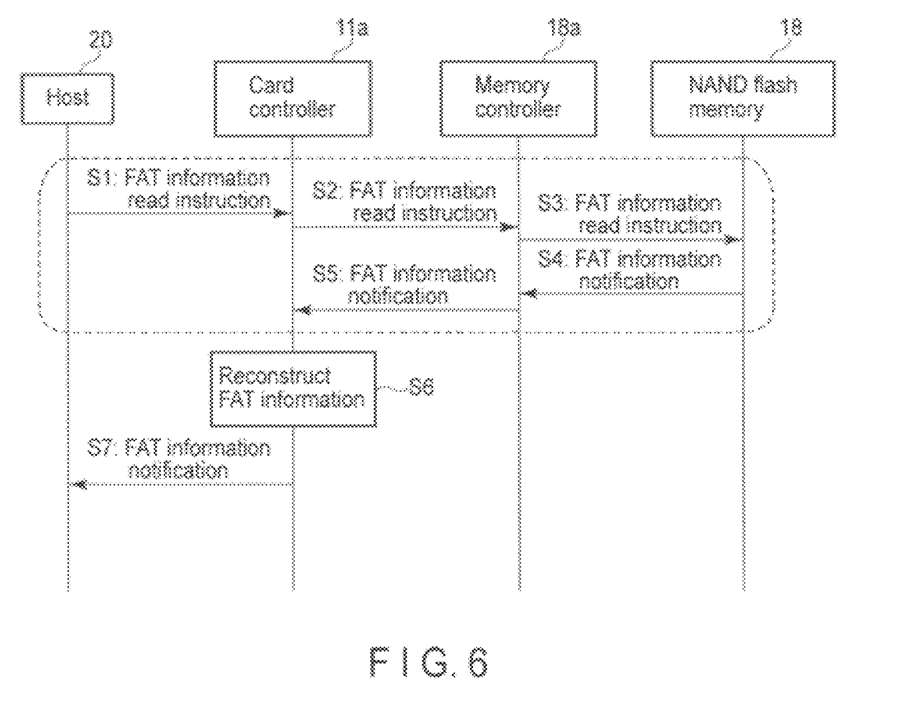
FIG. 6 illustrates an operation of a memory system applied to the present embodiment.

FIG. 6 shows an operation of the present embodiment. As shown in FIG. 6, when a FAT information read instruction (file name display instruction) is issued from the host 20 (S1), the card controller 11a issues a FAT information read instruction to the memory controller 18a (S2). The memory controller 18a issues a FAT information read instruction to the NAND flash memory 18 (S3). The NAND flash memory 18 reads FAT information based on the FAT information read instruction supplied from the memory controller 18a, and notifies the memory controller 18a of the read FAT information (S4).

Figure 7:
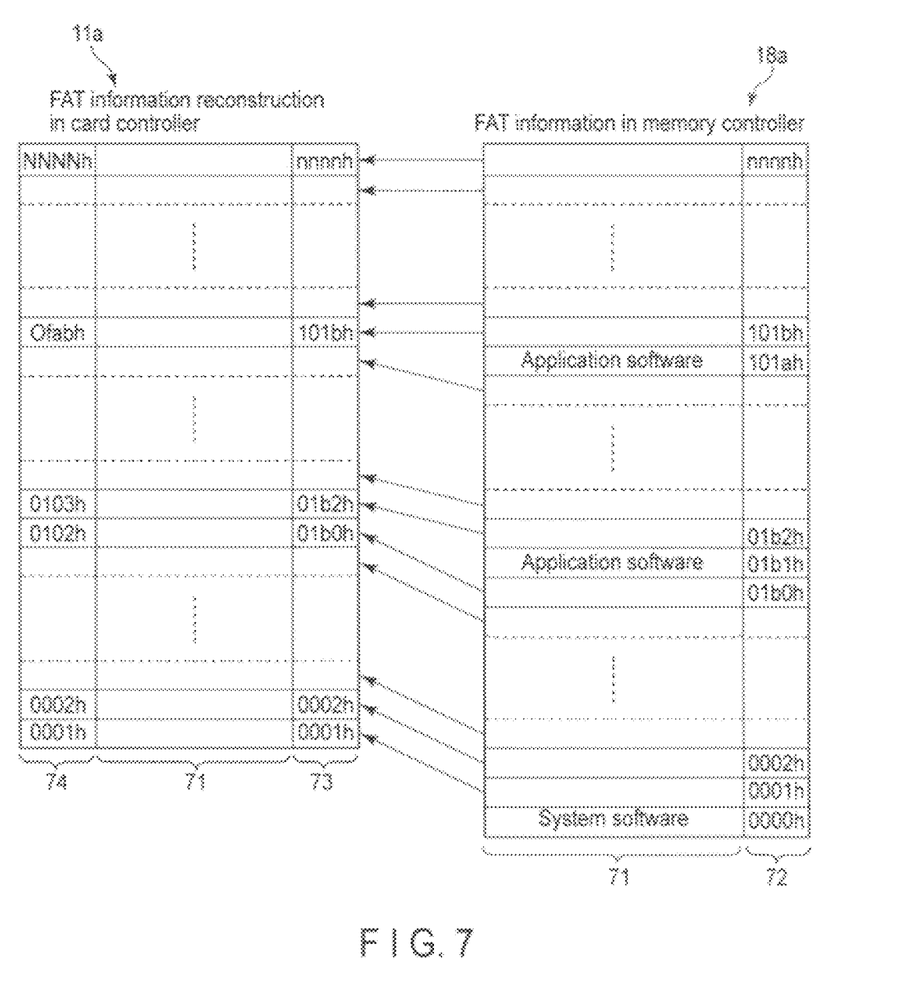
FIG. 7 shows an operation of a memory management area according to the present embodiment.

FIG. 7 shows details of the memory controller 18a and the card controller 11a. In FIG. 7, the FAT information read into a buffer, for example, of the memory controller 18a includes data accessible to the user and application software and system software of the wireless communication function, which the user should be prohibited from accessing. That is, the FAT information read into the memory controller 18a is formed of data accessible to the user, identification information (71) designed to identify the application software and the system software of the wireless communication function, which the user should be prohibited from accessing, and an address (72) indicating an area in which data and software corresponding to the identification information are stored.

After that, the memory controller 18a transfers the read FAT information to the buffer 16 of the card controller 11a (S5). In this case, of the FAT information, the memory controller 18a masks the application software and the system software of the wireless communication function, which the user should be prohibited from accessing, as shown in FIG. 7. That is, of the FAT information, the memory controller 18a transfers information excluding the application software and the system software of the wireless communication function, which the user should be prohibited from accessing, to the buffer 16 of the card controller 11a.

In this state, since the application software and the system software are excluded from the FAT information held in the buffer 16, the addresses appended to the transferred information are non-consecutive, as shown by (73) in FIG. 7. Accordingly, the card controller 11a reconstructs FAT information held in the buffer 16. More specifically, as shown by (74) in FIG. 7, addresses are reassigned such that the addresses corresponding to the identification information (71) included in the FAT information become consecutive (S6).

After the addresses are thus reassigned, the card controller 11a notifies the host 20 of the FAT information (S7). The FAT information includes consecutive addresses. Accordingly, the areas of the application software and the system software are not disclosed to the user, and the user is capable of managing the FAT area, from which the areas of the application software and the system software are excluded, as a consecutive memory space.

In the above-described state, when the host 20 issues a data write instruction, the host 20 cannot specify the area in which the application software or the system software is stored. When a data write instruction is issued from the host 20, the card controller 11a specifies a cluster in which data is to be written based on the FAT information shown in FIG. 7, and issues a write instruction to the memory controller 18a. The specified cluster is an area other than the areas in which the application software and the system software are stored. In order to write data to the instructed cluster, the memory controller 18a prevents the cluster in which the application software and the system software are stored from being corrupted.

When the user instructs data to be deleted, the user cannot specify the area in which the application software and the system software are stored. When such an instruction to delete data on an area other than the access-prohibited area is issued by the user, the card controller 11a specifies a cluster from which data is to be deleted based on the deletion instruction, and instructs the memory controller 18a to delete the data. The memory controller 18a deletes data in the specified cluster. It is thereby possible to prevent data in the cluster in which the application software and the system software are stored from being deleted.

Further, when the user instructs on the format of the NAND flash memory 18, the card controller 11a specifies a cluster corresponding to the access-prohibited area and not to be formatted, based on the FAT information, and issues a format instruction to the memory controller 18a. The memory controller 18a formats only the area excluding the specified cluster. After that, the memory controller 18a notifies the card controller 11a of the formatted FAT information. The card controller 11a reconstructs the FAT information, as described above, and notifies the host 20 of the FAT information with reassigned addresses.

In the process that follows, it is possible to similarly prevent the software designed to operate the communication function and the controller from being deleted or formatted by a format instruction from the user side.

According to the above-described embodiment, the FAT information read from the NAND flash memory 18 excluding identification information indicating access-prohibited areas, such as the application software and the system software, and the addresses corresponding thereto, is transferred to the host 20. It is thereby possible to prevent important information, such as application software and system software, from being altered or deleted.

Further, by designing the memory device such that the card controller 11a reconstructs the FAT information read by the memory controller 18a, a controller substantially same as the one used in a conventional memory device, which is not equipped with an extension function module, can be used as the memory controller 18a. For example, when the memory device 11 is an SD card, a conventional SD memory controller can be used as the memory controller 18a.

The FAT information is reconstructed by the card controller 11a, and the addresses in the FAT information are reassigned so as to be consecutive. This allows the user to manage the storage area of the FAT information as a consecutive memory space, thereby avoiding misoperations of the host 20 and the memory device 11 due to operating errors.

For example, the card controller 11a may be configured to set access-prohibited areas, such as the application software and the system software, and, when an access from the host device to the access-prohibited area is detected, return information indicating the area cannot be accessed. It is not easy, however, for the host device, such as a digital camera, to handle such information.

That is, in the case of an intelligent host device, such as a personal computer, when the user tries to access the access-prohibited area, the personal computer notifies the user that the area cannot be accessed. In the case of a host device with a simple configuration, such as a digital camera, however, such a failsafe function may not be provided. When such a host device tries to access the access-prohibited area of the memory device 11, there is a possibility that the memory device 11 itself is prohibited from accessing and the memory device 11 cannot be used.

In the present embodiment, on the other hand, by reconstructing the FAT information and assigning the addresses in the FAT information so as to be consecutive, access to the access-prohibited area is avoided, thereby preventing the above-described operating errors and malfunctions. This prevents the case where the memory device 11 cannot be used.

In the above-described embodiment, the wireless communication function is implemented on the memory device 11 as an application, but the present embodiment is not limited thereto, and other applications may be implemented as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
an application module;
a storage module configured to store user data, application software configured to control operation of the application module, and management information including identification information designed to identify the application software and including addresses respectively indicating areas storing the user data and the application software; and
a control module configured to control writing and erasing of the storage module,
wherein the control module:
excludes from access first information including the identification information and an address of the application software,
reconstructs the management information after exclusion of the first information, such that the addresses respectively indicating the areas storing the user data and the application software become consecutive, and
transmits the reconstructed management information to a host.

2. The system according to claim 1, wherein the application module is a wireless communication signal processor.

3. The system according to claim 2, wherein the application software is a program designed to drive the wireless communication signal processor.

4. The system according to claim 3, wherein the wireless communication signal processor is a wireless LAN (Local Area Network) signal processor.

5. The system according to claim 1, wherein the management information is FAT (File Allocation Table) information.

6. The system according to claim 1, wherein the control module includes a first control module and a second control module,
the first control module reads, from the storage module, the management information which includes information indicating an access-prohibited area, and
the second control module receives, from the first control module, the management information which excludes the information indicating the access-prohibited area.

7. The system according to claim 6, wherein the first control module is coupled with the storage module and the second control module is coupled with the first control module and the application module.

8. The system according to claim 1, wherein the storage module includes at least one NAND flash memory.

9. The system according to claim 8, wherein the system has a card shape.

10. The system according to claim 9, wherein the system is a SD card.

11. A memory system, comprising:
a wireless communication module:
a storage module configured to store user data, application software configured to control operation of the application module, and management information including identification information designed to identify the application software and including addresses respectively indicating areas storing the user data and the application software; and
a control module configured to control writing and erasing of the storage module,
wherein the control module:
excludes from access first information including the identification information and an address of the application software,
reconstructs the management information after exclusion of the first information, such that the addresses respectively indicating the areas storing the user data and the application software become consecutive, and
transmits the reconstructed management information to a host.

12. The system according to claim 11, wherein the management information is FAT (File Allocation Table) information.

13. The system according to claim 11, wherein the control module includes a first control module and a second control module,
the first control module reads, from the storage module, the management information which includes information indicating an access-prohibited area, and
the second control module receives, from the first control module, the management information which excludes the information indicating the access-prohibited area.

14. The system according to claim 13, wherein the first control module is coupled with the storage module and the second control module is coupled with the first control module and the application module.

15. The system according to claim 11, wherein the storage module includes at least one NAND flash memory.

16. The system according to claim 15, wherein the system has a card shape.

17. The system according to claim 16, wherein the system is a SD card.

* * * * *